United States Patent [19] [11] 4,283,967

Smilgys [45] Aug. 18, 1981

[54] EXTENDED RANGE VARIATOR CONVERSION MECHANISM

[75] Inventor: Bruno S. Smilgys, Hartford, Conn.

[73] Assignee: Veeder Industries Inc., Hartford, Conn.

[21] Appl. No.: 94,699

[22] Filed: Nov. 16, 1979

[51] Int. Cl.$^3$ .................... F16H 3/22
[52] U.S. Cl. .................... 74/681; 74/348
[58] Field of Search .................... 74/348, 349, 681

[56] References Cited

U.S. PATENT DOCUMENTS

| | | | |
|---|---|---|---|
| 2,986,951 | 6/1961 | Carriol | 74/348 |
| 3,413,867 | 12/1968 | Hamlin | 74/348 |
| 4,136,573 | 1/1979 | Smilgys et al. | 74/348 |

*Primary Examiner*—Lawrence J. Staab
*Attorney, Agent, or Firm*—Prutzman, Kalb, Chilton & Alix

[57] ABSTRACT

Conversion of an extended range mechanical fuel pump price variator for selectively substituting either a $2 or $3 optional unit volume price adder for an optional $1 unit volume price adder.

5 Claims, 1 Drawing Figure

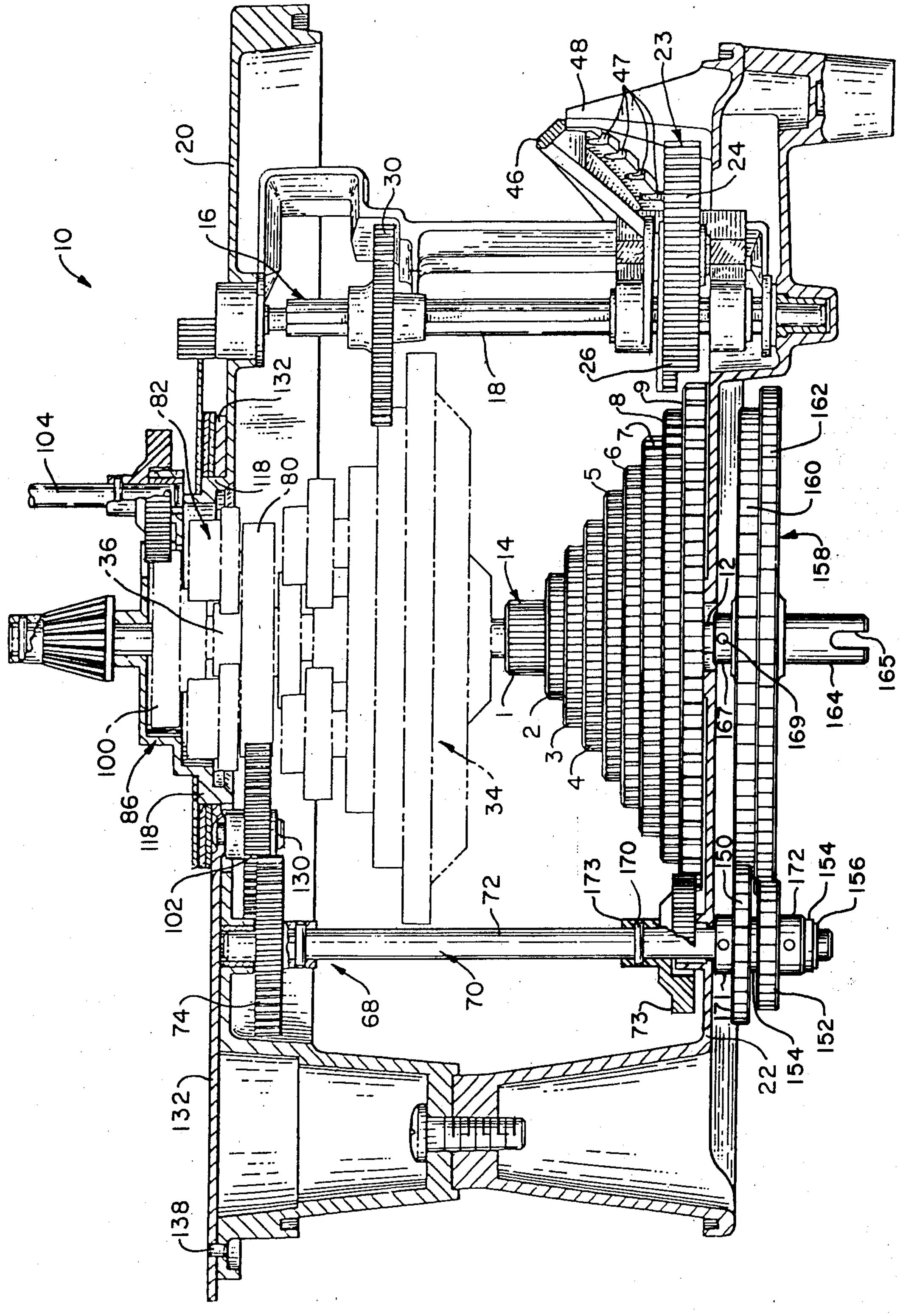
10
20
16
30
48
47
23
46
24
26
18
132
104
82
118
80
36
14
8
9
7
6
5
162
160
158
12
1
2
3
4
169
167
164
165
100
86
118
34
102
130
72
173
170
150
172
154
156
68
70
73
17
22
152
154
74
132
138

EXTENDED RANGE VARIATOR CONVERSION MECHANISM

DESCRIPTION

Technical Field and Background Art

The present invention relates generally to extended range mechanical fuel pump price variators of the type disclosed in U.S. Pat. No. 4,136,573 of Bruno S. Smilgys et al, dated Jan. 30, 1979, and entitled "Extended Range Fuel Pump Computer Price Variator" and operable for establishing and posting the unit volume price of gasoline within an available unit volume price range extending beyond $0.99 9/10 per unit volume, and more particularly relates to the conversion of such extended range variators to further extend the available price range of the variator.

DISCLOSURE OF INVENTION

Because of the rapidly escalating cost of gasoline, the price of a gallon of gasoline in the not too distant future may exceed the maximum available unit volume price of $1.99 9/10 cents per gallon or $2.99 9/10 cents per gallon of conventional extended range variators of the type shown in U.S. Pat. No. 4,136,573. It is therefore a principal aim of the present invention to provide conversion means for modifying or converting existing extended range mechanical variators of the type shown in U.S. Pat. No. 4,136,573 for further extending their available unit volume price range.

It is another aim of the present invention to provide new and improved extended range variator conversion means of the type described which does not substantially increase the variator torque load on its driving fuel meter and which permits field conversion of existing extended range variators with minimum inconvenience and downtime.

It is a further aim of the present invention to provide a new and improved mechanical fuel pump price variator having an extended multiple place unit volume price range of $0.00 0/10 to $2.99 9/10 or $3.99 9/10 or more.

It is another aim of the present invention to provide a new and improved mechanical fuel pump price variator settable within a unit volume price range extending above $3 or more.

Other objects will be in part obvious and in part pointed out more in detail hereinafter.

A better understanding of the invention will be obtained from the following detailed description and the accompanying drawing of an illustrative application of the invention.

BRIEF DESCRIPTION OF DRAWING

The drawing is an elevation section view, partly broken away and partly in section, of an extended range variator incorporating the present invention.

BEST MODE FOR CARRYING OUT THE INVENTION

Referring now to the drawing in detail wherein like reference numerals indicate like parts throughout, there is shown a mechanical fuel pump price variator or change speed mechanism 10 like the variator disclosed in FIGS. 1 and 2 of the aforementioned U.S. Pat. No. 4,136,573 which is operable for establishing and posting the unit volume price of gasoline within a four place unit volume price range of $0.00 0/10 cents per unit volume to $1.99 9/10 cents per unit volume in one tenth cent increments.

The variator 10 may be identical to the variator shown and described in FIGS. 1 and 2 of U.S. Pat. No. 4,136,573 excepting as hereinafter described and therefore will not be described in detail herein. Briefly, however, the variator 10 comprises a main drive or center shaft 12 adapted to be driven by a conventional fuel meter (not shown) of a gasoline dispensing system in accordance with the volume amount of gasoline dispensed. A nine step cone gear or gear stack 14 having gear steps 1–9 with respective numbers of teeth in accordance with the arithmetic progression 1*a*; 2*a* . . . 9*a* (e.g. 8, 16, 24, . . . 72) is mounted on the center shaft 12 for being driven by the shatft 12. Three range arms or take-off gear assemblies 16 (of which only one assembly 16 is shown in the drawing), comprising three parallel equiangularly spaced (i.e., 120° spaced) range arm shafts 18 rotatably mounted on the top 20 and base 22 of the variator frame, are provided for selective engagement with the gear steps 1–9 of the cone gear 14. Each range arm assembly 16 has a range arm 23 pivotally and slideably mounted on the respective range arm shaft 18 and adapted to be pivotally and axially positioned for selective engagement of its outer range arm idler gear 24 with each of the steps 1–9 of the central cone gear 14. An inner range arm gear 26 in mesh with the idler gear 24 is keyed to the range arm shaft 18 for rotating that shaft. A respective range arm output gear 30 affixed to the range arm shaft 18 provides an input into a differential summing mechanism 34 having an output gear 36 rotatably mounted on the variator center shaft 12. The relative gear ratios through the three range arms 23 to the summing mechanism output gear 36, via the range arm output gears and differential summing mechanism 34, are in accordance with the geometric progression 1*b*, 10*b*, 100*b* such that the three range arms operate to set the amount of the lowest, intermediate and highest places respectively of the lower three places of an available four place unit volume price. Thus, for example, with all three range arms 23 in engagement with the lowest and largest gear step 9 (e.g. having 72 teeth) the established lower three places of the four place unit volume price are 999 (e.g. 99.9 cents per gallon). With all three range arms 23 in engagement with the highest and smallest gear step (e.g. having 8 teeth) the established lower three places of the four place unit volume price are 111 (e.g. 11.1 cents per gallon). Also each range arm 23 may be selectively positioned in a lower position out of engagement with the cone gear 14 and with its idler gear 24 in engagement with a fixed tooth (not shown) integrally formed on the base 22. The range arm output is thereby locked against rotation to, in effect, establish a 0 for the respective place of the multiple place unit volume price. Thus, the three lower place range arms 23 can be selectively set into engagement with the respective fixed teeth (not shown) and the cone gear steps 1–9 to establish any unit volume price within a multiple place price range of 00 0/10 cents to 99 9/10 cents.

Each range arm 23 has a notched generally helical detent rack 46 with ten notches 47 for the ten positions of the range arm 23, and the base 22 is formed with a fixed integral detent finger 48 for each range arm for receipt within each of the ten notches 47 of the range arm 46 for accurately positioning the range arm idler gear 24 in angularly and vertically correlated positions for engagement with the respective fixed lockout tooth (not shown) and the steps 1-9 of the cone gear.

Referring to U.S. Pat. No. 4,136,573, the variator 10 has a set of three aligned numeral price posting wheels 50-52 of ascending order of significance on each of two opposed sides of the variator 10. Each numeral wheel 50-52 is mechanically connected to a bail 54 of the respective range assembly 16 to be angularly positioned in accordance with the pivotal position and therefore the setting of the respective range arm 23. Also the indicia 0-9 on each numeral wheel 50-52 are angularly spaced so that each set of numeral wheels provides for posting the lower three places of the unit volume price from 000 to 999 established by the three range arm settings.

The extended range variator 10 also employs an auxiliary unit volume price adder mechanism 68 for expanding or extending the unit volume price range of the variator from three places to four places. As explained in detail in U.S. Pat. No. 4,136,573, the auxiliary price adder mechanism 68 comprises an auxiliary take-off shaft assembly 70 having a vertical take-off shaft 72 (parallel to and suitably angularly offset from the range arm shafts 18) which is adapted to be driven by the central cone gear 14 by a shaft drive gear 73 (e.g. having eighteen teeth) mounted on the lower end of the auxiliary take-off shaft 72 in engagement with the largest gear step 9. The shaft drive gear 73 thereby provides for connecting the variator center shaft 12 for rotating the auxiliary take-off shaft 72 with a drive ratio of 4:1.

An auxiliary differential 82 is mounted coaxially on the center shaft 12 essentially above the differential summing mechanism 34 and immediately below the top or cover 20 of the variator frame, and the output gear 36 of the differential summing mechanism 34 provides one of the two input gears to the auxiliary differential 82. An output gear 100 of the auxiliary differential 82 provides a variator cost output gear adapted to be connected to a conventional fuel pump computer register (not shown, but which for example may be a register of the type disclosed in U.S. Pat. No. 2,814,444 of Harvey N. Bliss dated Nov. 26, 1957, and entitled "Register") for indexing the usual register cost counters (not shown) for registering the cost amount of fuel dispensed in accordance with the volume amount dispensed and the multiple place unit volume price established by the variator setting. The usual register vertical cost shaft 104 is shown in the drawing to illustrate how the cost counter drive train of the register is connected to the auxiliary differential output gear 100.

The auxiliary summing differential 82 is designed to provide a drive ratio from the center shaft 12, via the gears 9, 73 and the auxiliary take-off shaft 72 for selectively adding a fixed higher place price to the lower three place price established by the setting of the three range arms 23. In particular, a fixed higher place price setting of "1" is adapted to be selectively added to the lower three place price setting where as described, a 4:1 drive ratio is provided between the center shaft 12 and the auxiliary take-off shaft 72.

An idler or selector gear 102 is rotatably mounted on a fixed stub shaft 130 depending from a selector lever 132 rotatably mounted on a cylindrical step 118 of a cover dome 86. The idler gear operating lever 132 has two alternative operating positions. In a first operating position established by a frame locating pin 138, the lever 132 is positively located and locked in position with the idler gear 102 in engagement with a take-off shaft output gear 74 and a differential gear 80 of the auxiliary differential 82 to complete an auxiliary higher range drive to the auxiliary differential 82 to input a "1" higher place price setting into the auxiliary differential 82. In the alternative selector lever operating position established by a second frame locating pin (not shown), the selector gear 102 is held out of engagement with the take-off shaft output gear 74 and in operative engagement with a depending fixed tooth (not shown) of the variator cover 20 to input a "0" higher place price setting into the auxiliary differential 82.

Referring to U.S. Pat. No. 4,136,573, an auxiliary pivotal price shutter 152 and an indicator plate 154 are provided in general alignment with each set of price posting wheels for selectively displaying the auxiliary higher place price of "1" as selectively provided by the price adder mechanism. When the idler gear 102 is in its "1" adder position in operative engagement with the take-off shaft output gear 74, the pivotal shutters 152 are withdrawn from the indicator plates 154 to display with the indicator plates the "1" higher place setting of the auxiliary price adder mechanism 68.

Pursuant to the present invention, the extended range fuel pump price variator is modified to employ a substitute vertical take-off shaft 72 which extends below the base 22 of the variator frame and to employ a pair of additional take-off shaft drive gears 150, 152 mounted below the base 22 of the variator frame on the lower extension of the vertical take-off shaft 72. The additional take-off shaft drive gears 150, 152, although having different pitch diameters as shown in the drawing, may have the same number of teeth (e.g. twelve teeth in the described embodiment). Bearing washers 154 are mounted on the take-off shaft 72 between the additional drive gears 150, 52 and below the lower drive gear 152 and a suitable locking ring 156 is mounted on the lower end of the take-off shaft 72 for retaining the gears 150, 152 in proper vertical position on the take-off shaft 72. The variator base 22 is drilled to open the usual blind support bore in the variator base 22 for receiving the lower extension of the substitute take-off shaft 72. The shaft bearing sleeve provided in the blind bore in the variator base 22 is used for rotatably supporting the substitute take-off shaft 72.

A center compound gear 158 having an upper center gear 160 (e.g., with ninety-six teeth) in engagement with the take-off shaft drive gear 150, and a lower center gear 162 (e.g., having one hundred forty-four teeth) in engagement with the take-off shaft drive gear 152 is mounted on an elongated drive coupling sleeve 164 mounted on the lower end of the variator center shaft 12. The drive coupling sleeve 164 has a transverse quick disconnect drive coupling slot 165 at its lower end in a conventional manner. However, a modified drive coupling 164 is used in place of a conventional drive coupling (not shown) to provide an elongated support hub 167 for the compound gear 158 and for rigidly mounting the coupling sleeve 164 in coaxial relationship on the lower end of the variator center shaft 12. The drive coupling sleeve 164 is secured to the variator center shaft 12 by a suitable drive pin 169 inserted through aligned transverse bores in the coupling sleeve 164 and the center shaft 12.

The additional take-off shaft drive gears 150, 152 and the take-off shaft drive gear 73 are adapted to be individually and selectively coupled to the vertical take-off shaft 72 with a drive pin 170 inserted through aligned transverse bores in the shaft 72 and in axially projecting hubs 171, 172, 173, of the three drive gears 150, 152, 73. With the drive pin 170 installed in the drive gear 73, the take-off shaft 72 is driven directly by the cone gear 14 to provide a fixed 4:1 drive ratio from the center shaft 12 for selectively adding an auxiliary "1" higher place price with the selector lever 132 as previously described.

The additional take-off shaft drive gears 150, 152 remain uncoupled from the take-off shaft 72 when the drive gear 72 is pinned to the shaft 72. By removing the drive pin 170 from the drive gear 73 (to uncouple it from the shaft 72) and then inserting the same or a like drive pin 170 into a pair of aligned apertures in the shaft 72 and in the axially projecting hub 171 of the upper additional drive gear 150, the take-off shaft 72 is driven directly by the variator drive coupling sleeve 164 via the upper gear step 160 of the compound gear 158 and the upper drive gear 150 mounted on the take-off shaft to provide a fixed 8:1 drive ratio between the center shaft 12 and the take-off shaft 72. The drive ratio to the take-off shaft 72 is thereby increased by a factor of two for selectively adding an auxiliary "2" higher place price with the selector lever 132.

Similarly, by inserting the same or a like drive pin 170 in a pair of apertures in the shaft 72 and in the axially projecting hub 172 of the lower additional drive gear 152, the take-off shaft 72 is coupled to be directly driven by the variator drive coupling sleeve 164 via the lower gear step 162 of the compound gear 158 and the lower additional drive gear 152 to provide a fixed 12:1 drive ratio between the center shaft 12 and the take-off shaft 72. That gear train thereby provides for increasing the drive ratio to the take-off shaft 72 by a factor of three for selectively adding an auxiliary "3" higher place price with the selector lever 132.

Accordingly, the conversion mechanism provides for selectively substituting an optional $2 or $3 adder for the prior optional $1 adder for expanding or extending the available unit volume price range of the variator from $1.99 9/10 to $2.99 9/10 or to $3.99 9/10. When the optional $2 or $3 adder is selected, a suitable "2" or "3" indicator clip or element (not shown) is mounted on each indicator plate (not shown, but identified by the numeral 154 in U.S. Pat. No. 4,136,573) for posting the appropriate $2 or $3 adder price.

Conversion of the price adder mechanism to extend the unit volume price range of the variator by an optional $2 or $3 adder is thereby provided below the base 22 of the variator frame by the installation of two additional drive gears 150, 152, bearing washers 154 and a locking ring 156 on the lower end of a substitute take-off shaft 72. In addition, the conventional variator drive coupling sleeve (not shown) is removed and a combined compound gear and coupling assembly with an elongated coupling sleeve 164 and an integral compound gear 158 is mounted on the lower end of the variator center shaft 12 in its place. The elongated coupling sleeve 164 is mounted on the variator center shaft 12 so that its lower slotted end is at the same axial distance from the variator base 22 and whereby modification of the drive train to the variator 10 is not required. Finally, suitable "2" and "3" indicator clips or elements (not shown) are provided for posting the $2 and $3 adders when the $2 and $3 gear trains are selected.

It is contemplated that for example a three step compound gear (not shown) could be provided in place of the two step compound gear 158 described to provide an additional optional $4 adder. In that event, an additional take-off shaft drive gear (not shown, but e.g. having twelve teeth) is rotatably mounted on the take-off shaft 72 in mesh with the additional gear (not shown, but e.g. having one hundred twenty teeth) of the three step compound gear. The additional take-off shaft drive gear (not shown) could then be selectively coupled to the take-off shaft 72 in the manner of the take-off shaft drive gears 73, 150, 152 to provide an optional $4 adder in addition to the optional $2 and $3 adders described.

Similarly, a three step compound gear and three take-off shaft drive gears could be employed with an extended range variator of the type shown in FIGS. 3–6 of U.S. Pat. No. 4,136,573 (having both $1 and $2 adder selector positions of the selector lever) to provide optional $3, $4 and $5 adders (in the $1 position of the selector lever) and also provide an optional $6 adder with the $3 take-off shaft drive gear in the $2 position of the selector lever.

As will be apparent to persons skilled in the art, various modifications, adaptations and variations of the foregoing specific disclosure can be made without departing from the teachings of the present invention.

I claim:

1. A conversion mechanism for an extended range unit volume price variator mechanism settable for establishing the amount of each place of a multiple place unit volume price and comprising a variator frame with a base, a main drive shaft rotatably mounted on the variator frame with a lower input end thereof extending below the base, a primary stack of coaxial gears mounted on the main drive shaft above the variator base; a plurality of rotatable drive range arm assemblies for a plurality of places of ascending order respectively of the multiple place unit volume price having respective rotatable range arm shafts rotatably mounted on the variator frame with their axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and a higher place price selector mechanism for establishing a next higher place price to said plurality of places of ascending order and having a rotatable drive take-off assembly with a take-off shaft rotatably mounted on the variator frame generally parallel to and radially offset from the primary gear stack, a take-off shaft input gear in engagement with and driven by one of the gears of the primary gear stack and rotatably mounted on the take-off shaft for being coupled for directly rotating the take-off shaft therewith, and take-off shaft driven gear means driven by the take-off shaft; a rotary summation differential in operative engagement with said differential gear mechanism; and a higher place price selector with a selector member shiftable between a plurality of operational positions thereof and a selector gear rotatably mounted on the shiftable selector member for operatively interconnecting the take-off shaft driven gear means and summation differential in a first operational position of the shiftable selector member; the summation differential being operable for combining the rotatable drives through the differential gear mechanism and selector gear with relative drive ratios in accordance with the respective places of the unit volume price and whereby, with the take-off shaft input gear coupled for directly rotating the take-off shaft, the selector gear is adapted to be selectively shifted to its first position for selectively establishing a said next higher place price of a; the conversion mechanism being operable for converting the higher place price selector mechanism for selectively establishing a said next higher place price of (a+1) and comprising a replacement take-off shaft for being rotatably mounted on the variator frame with a lower end thereof extending below the base, a first center gear, means for mounting the first center gear below the base on the lower input end of the main drive shaft to be driven therewith, a first take-off shaft drive gear mounted on the replacement take-off shaft below the base and in operative engagement with the first center gear for driving the take-off shaft, in place of said take-off shaft input gear, at a drive ratio which is greater than the drive ratio through said input gear by a factor equal to (a+1)/a for establishing a said next higher place price of (a+1) with the shiftable selector member.

2. In an extended range unit volume price variator mechanism settable for establishing the amount of each place of a multiple place unit volume price and comprising a variator frame with a base, a main drive shaft rotatably mounted on the variator frame with a lower input end thereof extending below the base, a primary stack of coaxial gears mounted on the main drive shaft above the variator base; a plurality of rotatable drive range arm assemblies for a plurality of places of ascending order respectively of the multiple place unit volume price having respective rotatable range arm shafts rotatably mounted on the variator frame with their axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and a higher place price selector mechanism for establishing a next higher place price to said plurality of places of ascending order and having a rotatable drive take-off assembly with a take-off shaft rotatably mounted on the variator frame generally parallel to and radially offset from the primary gear stack, a take-off shaft input gear in engagement with and driven by one of the gears of the primary gear stack and rotatably mounted on the take-off shaft for being coupled for directly rotating the take-off shaft therewith, and take-off shaft driven gear means driven by the take-off shaft; a rotary summation differential in operative engagement with said differential gear mechanism; and a higher place price selector with a selector member shiftable between a plurality of operational positions thereof and a selector gear rotatably mounted on the shiftable selector member for operatively interconnecting the take-off shaft driven gear means and summation differential in a first operational position of the shiftable selector member; the summation differential being operable for combining the rotatable drives through the differential gear mechanism and selector gear with relative drive ratios in accordance with the respective places of the unit volume price and whereby, with the take-off shaft input gear coupled for directly rotating the take-off shaft, the selector gear is adapted to be selectively shifted to its first position for selectively establishing a said next higher place price of a; the improvement wherein the take-off shaft is rotatably mounted on the variator frame with a lower end thereof extending below the base, and wherein the extended range variator mechanism further comprises a conversion mechanism for converting the higher place price selector mechanism for selectively establishing a said next higher place price of (a+b), the conversion mechanism comprising a first center gear, means mounting each center gear below the base coaxially on the lower input end of the main drive shaft to be driven therewith, a first take-off shaft drive gear mounted on the lower end of the take-off shaft extending below the base and in operative engagement with the first center gear for driving the take-off shaft, in place of said take-off shaft input gear, at a drive ratio greater than the drive ratio through said input gear by a factor equal to (a+b)/a for selectively establishing a said next higher place price of (a+b) with the shiftable selector member.

3. In an extended range unit volume price variator mechanism settable for establishing the amount of each place of a multiple place unit volume price and comprising a variator frame with a base, a main drive shaft rotatably mounted on the variator frame with a lower input end thereof extending below the base, a primary stack of coaxial gears mounted on the main drive shaft above the variator base; a plurality of rotatable drive range arm assemblies for a plurality of places of ascending order respectively of the multiple place unit volume price having respective rotatable range arm shafts rotatably mounted on the variator frame with their axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and a higher place price mechanism for establishing a next higher place price to said plurality of places of ascending order and having a rotatable drive take-off assembly with a take-off shaft rotatably mounted on the variator frame generally parallel to and radially offset from the primary gear stack, a take-off shaft input gear in engagement with and driven by one of the gears of the primary gear stack and rotatably mounted on the take-off shaft for being coupled for directly rotating the take-off shaft therewith, and take-off shaft driven gear means driven by the take-off shaft; a rotary summation differential mounted for operative engagement with said differential gear mechanism, and said take-off shaft driven gear means, and operable for combining the rotatable drives through the differential gear mechanism and take-off shaft with relative drive ratios in accordance with the respective places of the unit volume price and whereby, with the take-off shaft input gear coupled for directly rotating the take-off shaft, the higher place price mechanism is operable for establishing a said next higher place price of a; the improvement wherein the take-off shaft is rotatably mounted on the variator frame with a lower end thereof extending below the base, and wherein the extended range variator mechanism further comprises a conversion mechanism for converting the higher place price mechanism for establishing a said next higher place price of at least (a+1), the conversion mechanism comprising at least one center gear, means mounting each center gear below the base coaxially on the lower input end of the main drive shaft to be driven therewith, a take-off shaft drive gear for each center gear mounted on the lower end of the take-off shaft extending below the base and in operative engagement with the respective center gear for driving the take-off shaft in place of said take-off shaft input gear, the said one center gear and the respective take-off shaft drive gear being operable for driving the take-off shaft at a drive ratio greater than the drive ratio through said input gear by a factor equal to (a+1)/a for establishing a said next higher place price of (a+1) with the higher place price mechanism.

4. A mechanism according to claim 1, 2 or 3 wherein the center gear mounting means is an elongated variator drive coupling mounted below the frame on the lower input end of the main drive shaft and having a quick disconnect coupling portion at the lower end thereof.

5. A mechanism according to claim 1, 2 or 3 wherein the conversion mechanism comprises a second center gear, a second take-off shaft drive gear mounted on the take-off shaft below the base and in operative engagement with the second center gear for driving the take-off shaft, in place of said take-off shaft input gear and said first center gear, at a drive ratio greater than the drive ratio through said first center gear.

* * * * *